United States Patent
Engel et al.

(10) Patent No.: US 9,582,929 B2
(45) Date of Patent: Feb. 28, 2017

(54) DYNAMIC SKYDOME SYSTEM

(71) Applicant: Confetti Interactive Inc., Encinitas, CA (US)

(72) Inventors: Wolfgang Engel, Carlsbad, CA (US); Igor Lobanchikov, Minsk (BY)

(73) Assignee: CONFETTI INTERACTIVE INC., Encinitas, CA (US)

( * ) Notice: Subject to any disclaimer, the term of this patent is extended or adjusted under 35 U.S.C. 154(b) by 253 days.

(21) Appl. No.: 14/293,151

(22) Filed: Jun. 2, 2014

(65) Prior Publication Data
US 2014/0354672 A1 Dec. 4, 2014

Related U.S. Application Data (60) Provisional application No. 61/831,115, filed on Jun. 4, 2013.

(51) Int. Cl.
*G09G 5/02* (2006.01)
*G06T 15/50* (2011.01)
*G06T 15/04* (2011.01)

(52) U.S. Cl.
CPC .......... *G06T 15/503* (2013.01); *G06T 15/04* (2013.01); *G06T 2210/62* (2013.01)

(58) Field of Classification Search
CPC .... G09G 5/02; G09G 5/06; G09G 2320/0666; G09G 2340/06; G06T 15/04; G06T 15/503; G06T 2210/62; G06T 11/001
See application file for complete search history.

(56) References Cited

U.S. PATENT DOCUMENTS

| | | | |
|---|---|---|---|
| 2003/0011618 A1* | 1/2003 | Deering | G06T 11/001 345/613 |
| 2006/0176303 A1* | 8/2006 | Fairclough | G06T 15/50 345/426 |
| 2014/0043330 A1* | 2/2014 | Ceylan | G06T 17/20 345/423 |

* cited by examiner

*Primary Examiner* — James A Thompson
*Assistant Examiner* — Xilin Guo
(74) *Attorney, Agent, or Firm* — Gavrilovich, Dodd & Lindsey LLP (57) ABSTRACT

The disclosure provides for a dynamic skydome system for generating dynamic atmospheric and/or sky effects for use in electronic visual media, such as for games and movies. The features of the dynamic skydome system of the disclosure include mimicking real-world behavior of the sky through a 24 hour cycle, providing a physically based rendering model with multiple atmospheric scatterings; simulating astronomically correct celestial bodies; producing god rays; providing aerial perspectives; and dynamically lighting volumetric clouds.

9 Claims, 10 Drawing Sheets

FIGURE 13

DYNAMIC SKYDOME SYSTEM

CROSS REFERENCE TO RELATED APPLICATIONS

This application claims priority under 35 U.S.C. §119 from Provisional Application Ser. No. 61/831,115, filed Jun. 4, 2013, the disclosure of which is incorporated herein by reference.

TECHNICAL FIELD

This disclosure provides for a system of generating real-time dynamic atmospheric and/or sky based effects for electronic visual media.

BACKGROUND

Developments in atmospheric or sky effects for electronic visual media have had a profound impact on many types of media and have revolutionized animation, movies and the video game industry.

SUMMARY

The disclosure provides for a dynamic skydome system that generates dynamic atmospheric and/or sky effects for use in electronic visual media, such as for games and movies. The features of the dynamic skydome system include, but not limited to, mimicking real-world behavior of the sky through a 24 hour day night cycle, providing a physically based rendering model with multiple atmospheric scatterings; simulating astronomically correct sun, stars, and moon; producing god rays; providing aerial perspectives; and dynamically lighting volumetric clouds.

Disclosed herein is a system for generating dynamic atmospheric effects for electronic visual media (i.e., a dynamic skydome system). The dynamic skydome system disclosed herein provides innovative methods for generating dynamic lighting effects for atmospheric objects, sky coloring, and scene presentation that are of a quality which greatly exceed those produced by current methods in electronic visual media.

In a certain embodiment, the disclosure provides a dynamic skydome system that performs dynamic actual lighting for all accumulated objects in one rendering pass, and/or calculates the color of the sky or atmosphere in the vertex shader, wherein the dynamic skydome system is carried out using a device comprising a graphics processing pipeline. In a further embodiment, the disclosure provides for a dynamic skydome system which comprises: lighting one or more objects using depth encoding and/or blending; rendering the one or more objects into a single impostor; and lighting the one or more objects in a single rendering pass.

In another embodiment, the disclosure provides a dynamic skydome system that performs actual lighting for all accumulated objects (e.g., clouds, celestial bodies, and atmospheric particles, such as fog, haze, or smoke) in one rendering pass comprising one or more steps of: rendering one or more objects accumulated depth and weight into a texture buffer using a blending algorithm to perform actual accumulation; reading the accumulated depth and depth weight from the texture buffer once all of the one or more objects are rendered to the screen and smoothing the read data using hardware texture bilinear interpolation; reconstructing the depth of the one or more objects using the smoothed read data; and/or performing actual lighting for all accumulated objects in one rendering pass by using the reconstructed depth to reconstruct position of the one or more objects.

In a particular embodiment, the disclosure provides for lighting one or more objects by implementing a blending algorithm comprising: (1) DepthAcc=OldDepthAcc*(1−newDepthWeight)+NewDepth*NewDepthWeight; (2) DepthWeightAcc=OldDepthWeightAcc*(1−newDepthWeight)+NewDepthWeight; and (3) Final depth=DepthAcc/DepthWeightAcc. In a further embodiment, a two channel floating-point 16-bit render target stores the accumulated depth and normalization weight of multiple particles for each pixel of impostor. In an alternate embodiment, a four channel floating-point 16-bit render target stores the accumulated depth and normalization weight of multiple particles for each pixel of an impostor and also stores normal or per-particle ambient occlusion data.

In a particular embodiment, a dynamic skydome system disclosed herein calculates the color of a sky or an atmosphere in the vertex shader by moving the texture coordinates and texture read into the vertex shader, and utilizing the vertex to pixel shader hardware interpolators to perform the interpolation in the $4^{th}$ dimension.

In another embodiment, the disclosure provides a dynamic skydome system that calculates the color of the sky and/or atmosphere in the vertex shader comprising one or more steps of: reading the low-frequency 4-dimensional data from the 3-dimensional texture using hardware linear interpolation in the vertex shader, writing the data from the previous step to a hardware interpolator with linear interpolation enabled, interpolating data for every pixel being generated by rasterizer using the hardware interpolator, reading the pixel data into the pixel shader from the hardware interpolator; and using the data to calculate sky and/or atmosphere color.

In a certain embodiment, a dynamic skydome system disclosed herein can perform one or more of the following: mimicking the real-world behavior of a sky through a 24 hour day night cycle; performing physically-based rendering with multiple atmospheric scatterings; simulating of celestial bodies that are astronomically correct; generating god rays; providing aerial perspectives; and dynamically lighting volumetric clouds.

In a further embodiment, the dynamic skydome system is carried out using a device comprising a graphics processing pipeline, such as a computer (e.g., a video game console) or flight simulator.

DETAILED DESCRIPTION

As used herein and in the appended claims, the singular forms "a," "and," and "the" include plural referents unless the context clearly dictates otherwise. Thus, for example, reference to "value" includes a plurality of such values and reference to "polygon" includes reference to one or more polygons and equivalents thereof known to those skilled in the art, and so forth.

Unless defined otherwise, all technical and scientific terms used herein have the same meaning as commonly understood to one of ordinary skill in the art to which this disclosure belongs.

The realistic simulation of outdoor scenes presents significant challenges. A common approach to simulate outdoor scenes is by modeling a dome (i.e., a skydome), to provide the impression of a sky and objects typically seen in the sky, such as clouds, moon, stars, and sun. A skydome can also be used to simulate outdoor scenes from hypothetical environments, such as atmospheres from imaginary worlds and moons.

Clouds play an important role in simulating outdoor environments. Realistic-looking clouds can be one of the most compelling graphical components of outdoor scenes, especially for real-world applications such as flight simulators and movie productions. The appearance of clouds is affected by the light cast by the sun and filtered from the sky, which must be reflected in the cloud shading. Moreover, in the real world, clouds do not remain static, they are dynamic. They move across the sky, from areas of moisture and unstable air, and dissipate when these conditions abate. Therefore, the presentation of clouds in electronic visual media should accurately reflect their dynamic nature.

Figure 1:
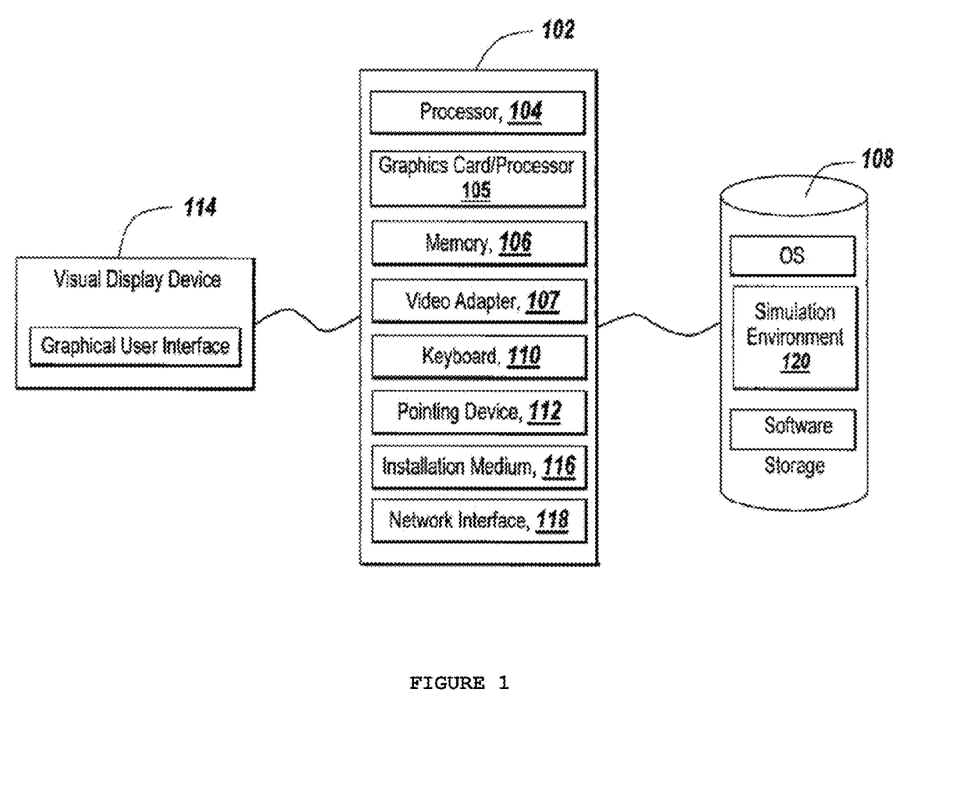
FIG. 1 is a block diagram of a computing device environment for practicing an illustrative embodiment of the present invention.

FIG. 1 depicts an environment suitable for practicing an illustrative embodiment of the dynamic skydome system of the disclosure. The environment includes a computing device 102 having memory 106, on which software according to one embodiment of the present invention may be stored, a processor ("CPU") 104 for executing software stored in the memory 106, and other programs for controlling system hardware. The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 114 such as a computer monitor, which may used to display a graphical user interface ("GUI"). The computing device 102 may include a video adapter 107 for providing for I/O operations with the visual display device 114.

Additionally, the computing device 102 may include a graphics card/processor 105 for handling one or more graphics processing functions of the computing device for displaying graphics, images, user interfaces, or any other type of visual element to the display device 114. In one embodiment, the computing device 102 includes an expansion card 105 that interprets drawing instructions sent by the central processor ("CPU") 104, processes them via a dedicated graphics processor 105, and writes the resulting frame data to the frame buffer, also called or otherwise is part of the video adapter 107. The graphics processor 105 may perform one or more graphics processing functions such as bitmap transfers and painting, window resizing and repositioning, line drawing, font scaling and polygon drawing. The graphics processor 105 may be designed to handle these tasks in hardware at far greater speeds than the software running on the system's central processor 104. The graphics processor 105 may be any type of graphics processor, such as any graphic processing chip provided or manufactured by Nvidia Corporation of Santa Clara, Calif., or Advanced Micro Devices, Inc. of Sunnyvale, Calif. The graphics processor 105 may be part of any type of graphics card, such as any of the graphics cards incorporating the Nvidia graphics processor, such as Nvidia's series of GeForce® graphics chip, or the Radeon® series of graphics cards from Advanced Micro Devices. One ordinarily skilled in the art will recognize and appreciate the various types and wide range of graphics card/processors 105 that may be used in the computing device 102.

Although generally described as a graphics processor 105, or a processor dedicated to graphics processing functions, the processor 105 can be any type of general purpose processor ("GPP"), or any other type of integrated circuit, such as a Field Programmable Gate Array ("FPGA"), Programmable Logic Device ("PLD"), or Application Specific Integrated Circuit ("ASIC"). Furthermore, although the illustrative embodiment of the computing device 102 is described with a separate processor 105 for graphics related processing, the central processor 104 may provide for such graphics related processing. Alternatively, the computing device 102 may have multiple processors to distribute processing of computing tasks, along with any graphics processing functions. In one embodiment, the graphics card/processor 105 of the computing device 102 has multiple graphics processors, such as for example the dual GPU graphics card provided or manufactured by Giga-Byte Technology, Co. LTD of Taipei Hsien, Taiwan. In another embodiment, the graphics processor 105 performs graphics-oriented operations but also other computations, such as any operation of the processor 104, such as a CPU. One ordinarily skilled in the art will recognize and appreciate that any type of computing device with any type of processor may be used to perform the operations of the present invention as described herein.

Figure 2:
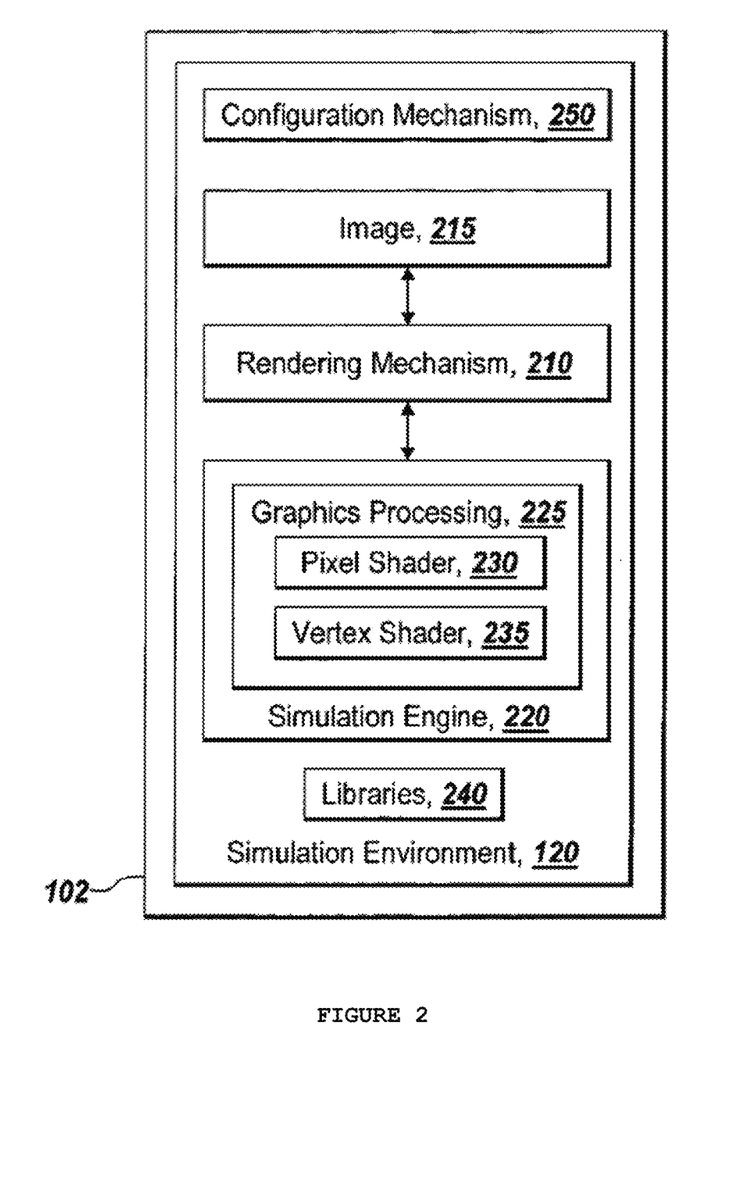
FIG. 2 is a block diagram of an illustrative simulation environment for practicing an embodiment of the present invention on the computing device of FIG. 1.

In FIG. 2, the dynamic skydome system disclosed herein provides a simulation environment 120 for generating, modeling, creating, editing or otherwise handling, manipulating and processing images. In brief overview, the simulation environment 120 provides a platform for image based design, processing, and simulation of outdoor and/or indoor scenes including naturally occurring atmospheres and terrains, naturally occurring dynamic systems, along with any man-made objects, structures and/or system. The simulation environment 120 may include one or more images 215 representing visually, graphically, or otherwise, a scene, such as an outside scene. For example, the image 215 may comprise a photo realistic, near photo realistic or otherwise substantially realistic representation of an outside scene including an atmosphere, such as a sky, sun, stars, moon, and clouds.

The simulation environment 120 includes a graphical user interface for interactively creating and working with images 215 and may also provide for simulating, editing, configuring, and processing the images 215. The simulation environment 120 may read, save, interpret, or otherwise process image files in any format known to one ordinarily skilled in the art.

The simulation environment 120 may comprise any suitable configuration mechanism 250 for configuring any elements and properties of the image 215, the simulation and rendering of one or more images 215, and/or the simulation environment 120. The configuration mechanism 250 may comprise any type of user interface, such as a graphical user interface or command line interface. As such, it may comprise any user interface mechanisms such as menu items, forms, toolbars, etc. as known by ordinarily skilled in the art to provide a user interface to receive user input with regards to configuration.

The simulation environment 120 also comprises one or more libraries 240 to provide for the processing of images and at least a portion of the operations of the present invention described herein. Although described as libraries 240, the libraries 240 may take the form of any type of executable instructions capable of performing the operations described herein.

In an exemplary embodiment, the libraries 240 may include Direct3D or DirectX SDK manufactured by Microsoft Corporation of Redmond, Wash., to provide an application programming interface ("API") in the operating system to graphics and sounds functionality provided by the hardware of the computing device 102. In some embodiments, the libraries 240 include any application programming interfaces, APIs, supporting the OpenGL standards and specifications as known by those ordinarily skilled in the art.

Additionally, the libraries 240 may include any portion of the CG Toolkit manufactured by Nvidia, Inc. of Santa Clara, Calif., wherein Cg is a high level language for graphics programming. The libraries 240 may also include any portion of executable instructions manufactured by The Freetype Project located at www.freetype.org, which is a high quality, portable font engine, and in other embodiments, may include any suitable font engine. Additionally, the libraries 240 may include any executable instructions of the Developer's Image Library (DevIL) manufactured by Denton Woods.

The libraries 240 of the simulation environment 120 may include any programming related APIs and libraries, such as STLport manufactured by STLport Consulting of San Francisco, Calif., Xerces of the Apache XML Project provided by the Apache Software Foundation, Inc. of Forest Hill, Md., and any publicly available libraries authored by Beman Dawes and David Abrahams, located at boost.org. Additionally, to support file and data compression related functionality in the simulation environment 120, the libraries 240 may include any type of compression libraries such as the Zlib library provided by The GNU Project of the Free Software Foundation of Boston, Mass. Furthermore, the libraries 240 may include windowing and graphical widgets for graphics APIs and engines such as Crazy Eddie's GUI System, located at cegui.org.uk, which is a publicly available object orientated tool for building graphical user interface systems.

The simulation environment 120 comprises a simulation engine 220 and rendering mechanism 210. The simulation engine 220 provides the graphics processing 225 functionality and instructions of the present invention for image simulation and the rendering of the image 215 via the rendering mechanism 210. The rendering mechanism 210 includes means and mechanisms as known by those ordinarily skilled in the art to cause the rendering of the image 215 to the visual display device 114 of the computing device 102. In the rendering stage of graphics/image processing, typically performed by the graphics card/processor 105 in conjunction with the video adapter 107, the pixels are drawn to the video display device 114.

The graphics processing 225 portion of the simulation engine 220 comprises shader programs, such as pixel shader program 230 and vertex shader program 235. The terms "shaders" may be used instead of program or shader program to refer to the portions of executable instructions that program certain parts of the graphics processing pipeline. The computational frequency that may be supported in graphics related hardware, such as a graphics card/processor 105, is per vertex and per pixel/fragment. As such, there are two different kinds of shaders: vertex shaders 235 and pixel shaders 230. A pixel shader 230 provides graphics processing on a pixel basis, and a vertex shader 235 provides graphics processing on a vertex basis.

Pixel shaders 230 may also include or be referred to as fragment shaders. As known by those ordinarily skilled in the art, fragments are all the points of three-dimensional scene that are projected onto a two-dimensional xy-plane, such as in an OpenGL® based implementation. A fragment contains information such as position and texture coordinates, and several fragments can be added together when displayed to a pixel on the screen.

As known by those ordinarily skilled in the art, a vertex shader 235 is a set of graphics processing instructions used to add special effects to objects in a three-dimensional (3D) environment by performing mathematical operations on an object's vertex data. Objects in a 3D scene, such as those provided by the image 215 of the simulation environment 210, may be described using polygons such as triangles, which in turn are defined by their vertices. Vertex data refers to the data set identifying and/or describing the vertices of the triangles representing the 3D scene. A vertex shader 235 can change the position or any other attributes of a vertex. Vertex shaders 235 may get executed for each vertex that passes through the graphics processing pipeline.

Pixel shaders 230 as known by those ordinarily skilled in the art are graphics processing instructions that calculate effects on a per-pixel basis. In some embodiments, the pixel shader 230 receives as input computational results from a vertex shader 235, such as the vertex position. Generally in the art, the pixel shader 230 uses input provided by the vertex shader 235 and any other attributes, such as user-defined attributes, generated or modified colors and texture coordinates, and combine the information to form a final color value that gets passed to the final stages of rendering. However, in a particular embodiment, the dynamic skydome system disclosed herein calculates the sky and/or atmosphere color in the vertex shader 235 instead of the pixel shader 230 by utilizing hardware interpolators between the vertex shader 235 and the pixel shader 230.

With the graphics cards/processor 105 of the computing device 102 being programmable, the pixel shader 230 and vertex shader 235 can comprise customized executable instructions to provide desired graphics processing of vertex and pixel/fragment data associated with the image 215. In an exemplary embodiment, the simulation environment 210 provides at least a portion of the real-time execution of the realistic approximation of natural atmospheric lighting phenomena of the present invention via one or more vertex shaders 235 and/or pixel shaders 230.

The simulation environment 120, and any portion thereof, can be an application, module, library, software component, or any other type of computer program or executable instruction which is designed to and capable of executing the functionality of the simulation environment 120 as described herein. Additionally, the simulation environment 120, and any portion thereof, may be executed as an application, program, service, process, task, or any other form of execution unit known by those skilled in the art. Furthermore, the simulation environment 120, and any portion thereof, may be designed to run on any type of processor 104, 105 microprocessor, operating system, or computing device 102.

The simulation environment 120 can be capable of and configured to operate on and take advantage of different processors of the computing device 102. For example, the simulation environment 120 can run on a 32 bit processor of one computing device 102 and a 64 bit processor of another computing device 102. Additionally, the simulation environment 120 can be capable of and configured to operate with and take advantage of different graphical cards/processors 105 of the computing device 102. For example, any shader program 230, 235 of the simulation engine 220 may be designed to operate on and take advantage of any type of graphical processor 105. Furthermore, the simulation environment 120 can operate on computing devices 102 that can be running on different processor architectures with different graphical processing cards and processors in addition to different operating systems. One ordinarily skilled in the art will recognize the various combinations of operating systems, processors, or graphical cards that can be running on the computing device 102. In summary, the simulation environment 120 may be deployed across a wide range of different computing devices, different operating systems, and different processors in various configurations. One ordinarily skilled in the art will appreciate the various ways the present invention may be practiced in a computing device.

In a particular embodiment, for the dynamic skydome system disclosed herein, the image 215 provided by the simulation environment 120 comprises a realistic graphical and/or visual representation of an outdoor scene including a natural atmospheric environment. In one embodiment, the image 215 is a photo realistic, near photo realistic or otherwise substantially realistic representation of the outdoor scene. The scene may comprise any combination of naturally occurring and/or man-made objects. In a brief overview, the scene may comprise a terrain and an atmosphere. The terrain may include any physical features and characteristics of a planet's surface, such as the earth or any other orbiting celestial object. As such, the terrain may include a landscape with any type of land mass and one or more bodies of water. For example, the land mass may include any type of mountain or hill, or any range of mountains and hills. The bodies of water may be any type of water such as a puddle, pond, lake, sea or ocean. Additionally, the terrain may include any man-made objects and/or structures, such as vehicles, buildings, houses, and bridges. For example, the terrain may provide a realistic representation of any man-made structures or objects seen in any city, town, or country side known in the world. Also, the terrain may include any flora or any other type of animal or creatures, either living or fictional. Additionally, the terrain may include any fauna, or any other type of plant-life or vegetation, either actual or fictional.

The atmosphere represented by the scene of the image 215 may include the sky, a sun, one or more clouds, one or more celestial objects, and one or more types of atmospheric particles. The clouds may be any type and/or any portion of a formation of a cloud. The atmosphere may represent any portion of the atmosphere of the earth, or any other planet or orbiting celestial land mass. The celestial objects may be any naturally occurring objects in the atmosphere, sky, or space, such as the sun, moon, planets and stars. The atmosphere generally represents air molecules, such as clean air molecules, that may be available in any portion of the sky or atmosphere of the scene. The atmosphere may include any man-made objects such as aircraft or satellites. Additionally, the atmosphere may include any flora, or any other type of animal or creature, either living or fictional. The atmospheric particles represent portions of the atmosphere other than air molecules, such as ice, rain, water droplets, crystals, snow, fog, haze, dust, smoke, pollutants, and any other particles, solid or otherwise, that may be an element of the atmosphere and/or sky.

Although the scene is generally described as a photo or near photo realistic representation of known and existing terrain and atmosphere, the scene may provide a photo or visual realistic representation of fictional terrain and atmosphere. Instead of the terrain and/or atmosphere of the scene of the image being provided by terrain data related to actual measurements of terrain and atmospheric components related to the earth, the terrain and/or atmosphere may be generated or otherwise provided to realistically represent an imaginary scene. As such, the scene may not be a scene of a terrain and atmosphere existing in the world but nevertheless may look as an actual existing terrain and atmosphere due to the photorealistic or visual realism of the image 215.

In order to provide for photorealistic or otherwise visually realistic representation of the scene, the effect of the physics of light and optics needs to be considered for the many objects of the terrain and/or atmosphere, and the dynamic interactions between them. For example, the effect of light from the sun and the sky along with shadows casted by clouds need to be considered to determine the color of a rendered object in the image 215 as seen by a viewer from a certain viewing position with respect to a view of the scene.

In another aspect, the present invention relates to the simulation and rendering of the natural atmospheric lighting phenomena associated with the scene of the image 215, and any objects of the scene.

Figure 3:
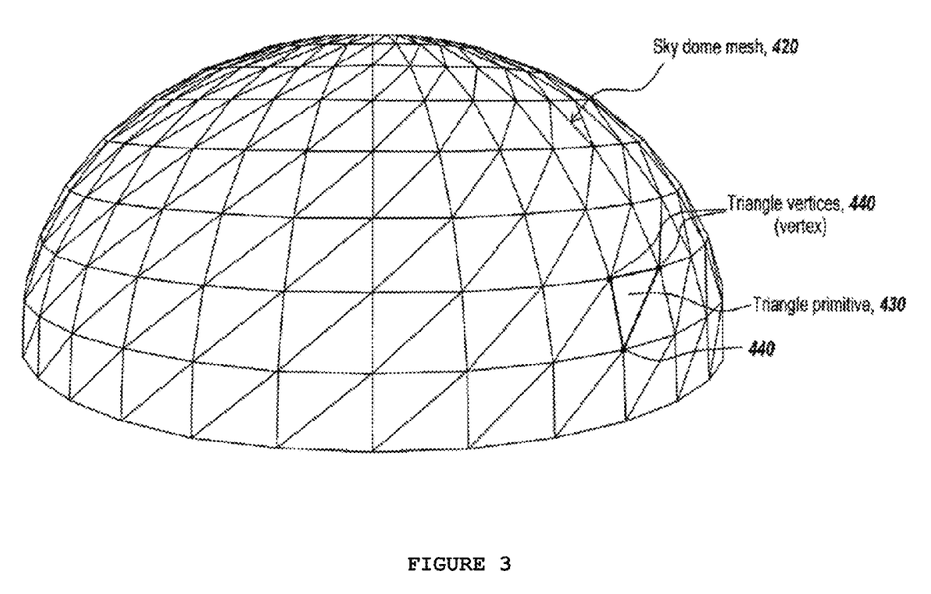
FIG. 3 is a diagrammatic view of an illustrative skydome mesh for practicing an embodiment of the present invention.

As a realistic representation, image 215 represents a three-dimensional (3D) view of an outdoor scene. This 3D representation needs to be projected and rendered to a two-dimensional (2D) display of the visual display device 114 of the computing device 102. In a brief overview, a scene comprises a terrain mesh and a skydome mesh 420 integrated to form a geometric polygon representation of a scene which includes image 215. The terrain mesh provides a mesh for the terrain portion of a scene and the skydome mesh 420 for the atmospheric (e.g., sky) portion of the scene. In an exemplary embodiment, the atmosphere's geometry is defined as the set of all points below an infinite plane with some user-specified height above the viewer, although more complex models can be used as known by those ordinarily skilled in the art.

FIG. 3 depicts an illustrative wire screen rendering of the skydome mesh 420. For illustrative purposes and by way of example, the skydome mesh 420 comprises multiple triangle primitives 430. In computer graphics processing, a primitive 430 is a fundamental shape or object used primarily in the construction of more complex objects. In the example of FIG. 3, the skydome mesh 420 is a complex polyhedron made up of a series of connected triangle primitives 430. Each corner of a triangle primitive 430 forms a vertex 440 and each triangle primitive 430 has three vertices 440. A vertex 440 is the point where the sides of a polygon meet. That is, a vertex is a point in 3D space that defines a corner of one or more polygons, such as the triangle primitive 430. Although the present invention is illustrated using a triangle primitive 430, any type of suitable shape or polygon may be used for geometric representation of an image 215. Increasing the number of primitives or polygons of a sky dome mesh 420 enables more detailed and complex geometric representation of a scene. As such, increasing the number of polygons geometrically representing the image 215 improves the visual realism of rendering a scene.

In one embodiment, the invention provides techniques for determining the color of the triangle primitives 430 of a skydome mesh 420 to graphically render a scene to realistically represent natural atmospheric lighting. These techniques enable the graphical processing and rendering of the simulation of the natural atmospheric lighting to occur at sufficiently high enough rates to allow for a realistic representation of atmospheric objects in a scene. Furthermore, the dynamic skydome system disclosed herein not only provides for real-time rendering speeds but also provides for photo realistic, near photo realistic, visually realistic or otherwise substantially realistic simulation of natural atmospheric lighting. As such, the present invention provides a simulation environment 120 that can simulate and render images 215 in real-time and in a continuous manner to show the realistic visual effects of changes in natural atmospheric lighting upon one or more images 215.

Figure 4:
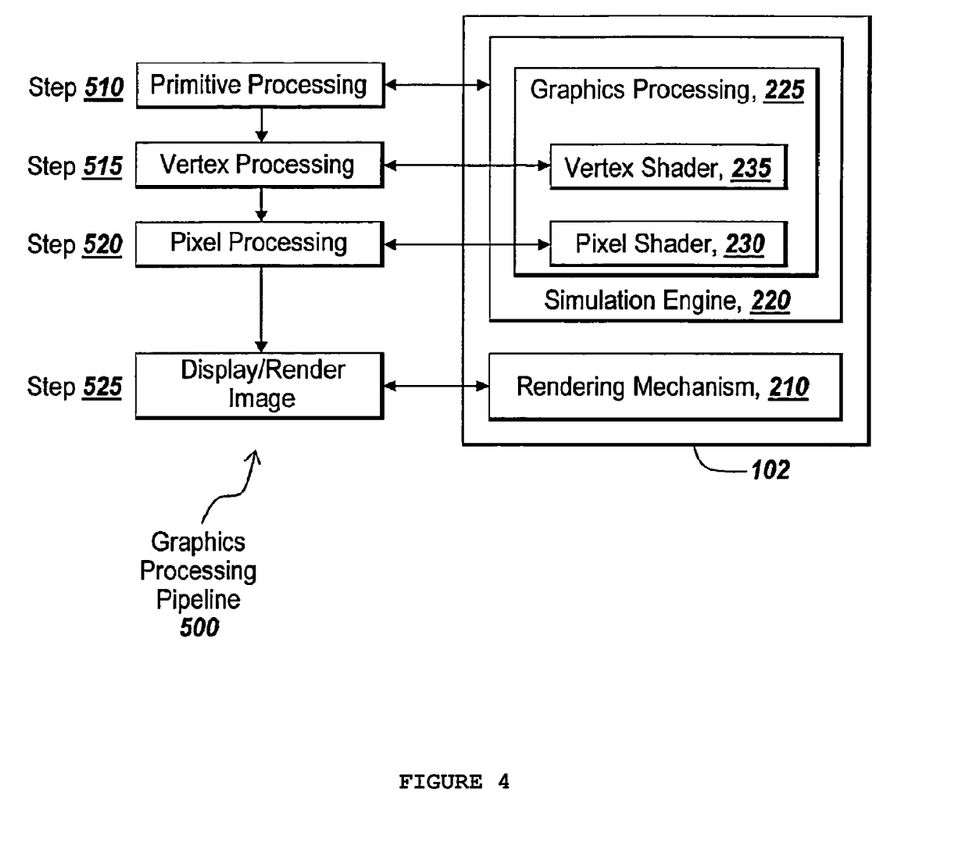
FIG. 4 is a flow diagram depicting steps performed in an illustrative method of a graphics processing pipeline in an illustrative embodiment of the present invention.

FIG. 4 depicts an illustrative method 500 of graphics processing of the present invention practiced in conjunction with the illustrative embodiment of FIG. 2. The illustrative method 500 represents at least a portion of the functionality of a typical graphics processing architecture, also referred to and known in the art as a graphics processing pipeline. The graphics processing pipeline depicted by illustrative method 500 may consider and perform any graphics processing functions known by those ordinarily skilled in the art in fixed-function or programmable graphics related hardware. The illustrative method 500 of the present invention performs primitive processing at step 510, vertex processing at step 515, pixel processing at step 520 and rendering at step 525. Primitive processing of illustrative step 510 may include any type of processing performed by the graphics card/processor 105 and/or the graphics processing portion 225 of the simulation engine 220 on a primitive 430, such as the triangle primitives of the skydome mesh 420.

In an exemplary embodiment, the graphics processing pipeline depicted by illustrative method 500 is programmable via shaders 230 and 235. As such, a vertex shader 255 of the graphics processing 225 portion of the simulation engine 220 may provide desired vertex processing operations at step 515 to provide for the realistic simulation and real-time rendering of the natural atmospheric lighting of the dynamic skydome system disclosed herein. Likewise, a pixel shader 230 may provide desired pixel/fragment processing operations at step 520 to provide for the realistic simulation and real-time rendering of the natural atmospheric lighting.

At step 525 of the illustrative method, the final colors 450 of each of the primitives 430 of the mesh 400 representation of the image 215 are rendered as impostors to a visual display device 114. Via the rendering mechanism 210, impostors are written and/or read to the frame buffer of the video adapter 107 of the computing device 102. There may be hundreds to thousand or more polygons for each frame of a scene which must be updated and transmitted to the frame buffer. The frames are further processed, converted or transformed into suitable analog and or digital output signals of the visual display device 114. The rate of transfer to the frame buffer and/or visual display device 114 is known as frame rate and is measured in frames per second (fps). Each frame of a scene must be updated and transmitted through the frame buffer at a certain rate to give the illusion of movement.

Figure 10:
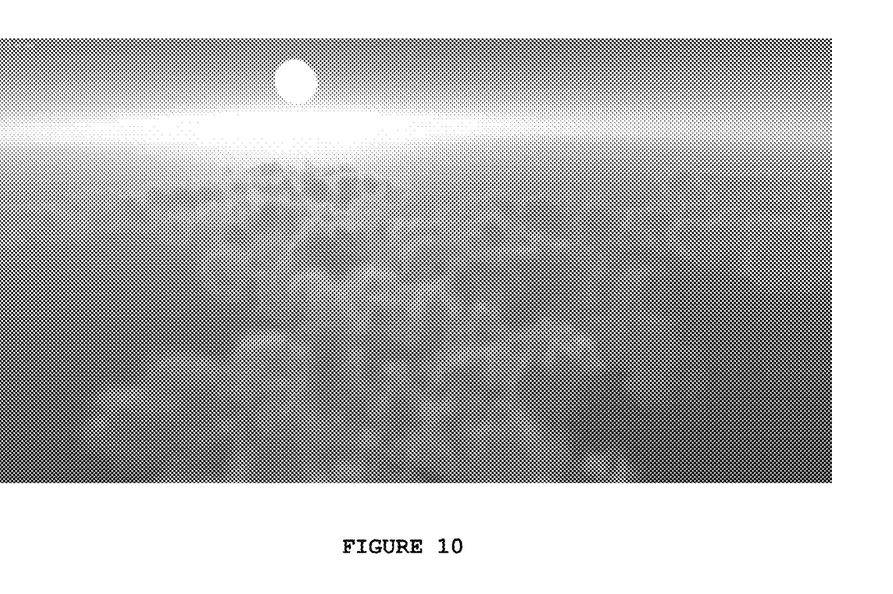
FIG. 10 presents a cloud lighting effect generated by the dynamic skydome system of the disclosure.

In order to accelerate rendering, imposters have generally been utilized. Imposters are transparent polygons (i.e., billboards) with an opaque texture mapped onto them. Impostors are used to accelerate rendering by exploiting frame-to-frame coherence. Impostors are particularly well suited to clouds, even in circumstances under which they cannot be applied to the rendering of polygonal geometry. By using impostors, the dynamic skydome system of the disclosed can render cloudy scenes of hundreds of clouds and hundreds of thousands of particles at very high frame rates. For example, the dynamic skydome system disclosed herein can be used to render multiple cloud images into a single imposter and provide lighting effects for each cloud image in a single rendering pass (e.g., see FIG. 10).

Steps for rendering an imposter into a scene can comprise: cleaning the texture buffer; setting up the view for rendering the object; rendering a part of the view (the size of the objects bounding box) onto a texture that is stored in texture memory; and placing a billboard in the virtual world and rendering the imposter texture onto it. Impostors can be updated dynamically. With this strategy, if the user moves slowly or comes to a complete halt, the image can be progressively refined to the correct image—that is, the one that would have been obtained by rendering the original geometry. A disadvantage of dynamically generated impostors arises from the potentially unbounded complexity of the geometry that needs to be converted into the image-based representation. As the updates are done on the fly, they must fit into the frame-time budget allocated for generating the image 215.

The dynamic skydome system disclosed herein can visually and realistically simulate and render in real-time natural atmospheric lighting and related phenomena for one or more images in an outdoor scene at high frame rates per second. Further, the dynamic skydome system disclosed herein provides methods to approximate the visual effects of natural atmospheric lighting and related phenomena that are visually realistic which are computed in real-time to render frames of a scene at high frame rates per second. The dynamic skydome system presented herein accounts for the light scattering effects due to sunlight and ambient light in relation to objects, atmospheric particles and other scene elements.

The dynamic skydome system disclosed herein can provide images and simulations having visually realistic representations of sunlight at any time of day, including from dawn to twilight, along with accurate shadowing effects. The dynamic skydome system of the disclosure can also provide images and simulations having visually realistic representations of night or darkness cycles, including the presentation of celestial objects such as stars and moons.

Additionally, the dynamic skydome system of the disclosure provides visually realistic representations of a wide range of cloud formations, resulting cloud cover over the landscape of a scene, and shadows cast by clouds on elements of the scene. Furthermore, the present invention provides a realistic simulation of the visual effects from light scattering by the cloud cover, such as god rays, and also provides visually realistic simulation of atmospheric particles of water (i.e., rain, hail, snow, mist, and fog) including accurate reflections, refractions, and turbulence. In a particular embodiment, an atmospheric particle represents a portion of one or more of the following: a cloud, rain, ice, dust, fog, haze, smoke, pollutants, and air. In a further embodiment, at least one of the one or more atmospheric objects represents one or more of the following: a sky, a cloud, a celestial body, and a man-made item. In yet a further embodiment, the dynamic skydome system of the disclosure can determine the appropriate color for an object by calculating a realistic approximation of a visible effect on the natural atmospheric lighting phenomenon from one or more of the following: in scattering light from atmospheric particles, out scattering light from atmospheric particles, sunlight illumination, ambient illumination, cloud appearance, cloud density, cloud lighting, and cloud shadowing. In another embodiment, the dynamic skydome system disclosed herein includes depicting the movement of at least one atmospheric object in the scene.

Figure 5:
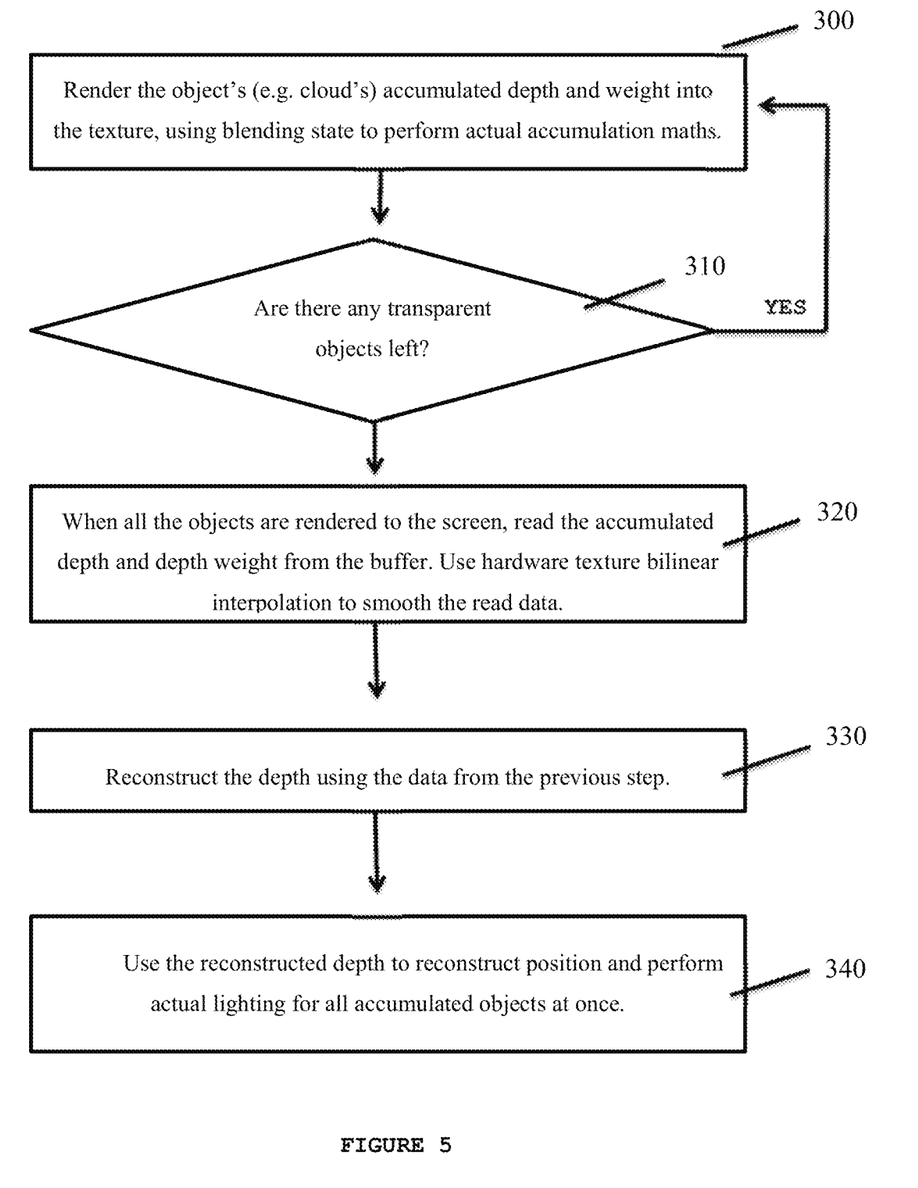
FIG. 5 is a flow diagram(s) depicting steps performed in an illustrative method of the dynamic skydome system disclosed herein for implementing lighting effects for atmospheric objects.
Figure 11:
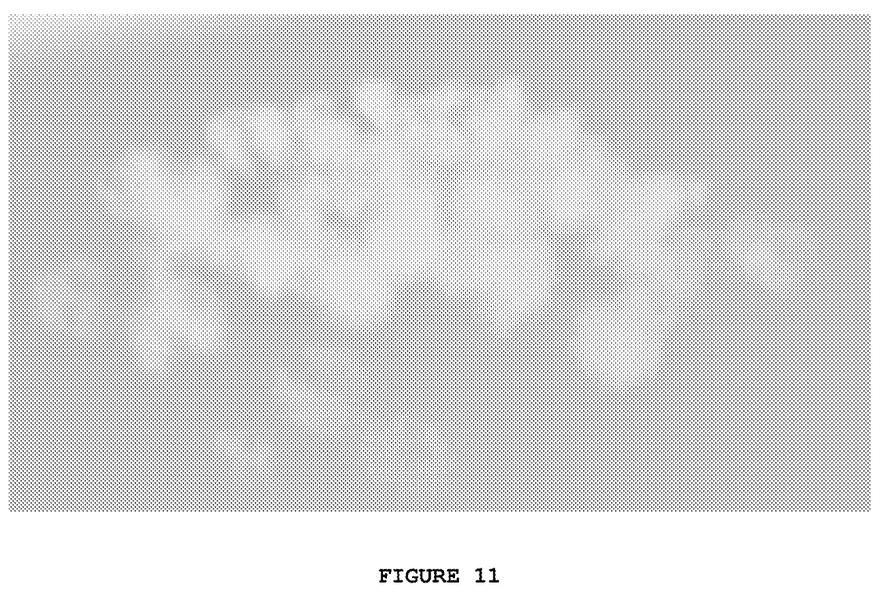
FIG. 11 demonstrates typical errors in lighting due to using flat imposter positions.

One of the many challenges with lighting a large number of visually depicted objects is that each object is an imposter and the imposter is flat. Accordingly, to calculate a reasonable position for lighting each pixel is extremely difficult (e.g., see FIG. 11). The disclosure provides a dynamic skydome system that overcomes these difficulties by providing an innovative way to calculate lighting each pixel in imposter space. In a particular embodiment, the disclosure provides for a dynamic skydome system which comprises one or more steps of: lighting one or more objects using depth encoding and/or blending; rendering the one or more objects into a single impostor; lighting the one or more objects in a single rendering pass; and/or calculating the color of the sky or atmosphere in the vertex shader. In a further embodiment, a dynamic skydome system performs actual lighting for all accumulated objects in one rendering pass (e.g., see FIG. 5) comprising the steps of: rendering one or more objects accumulated depth and weight into a texture buffer using blending state to perform actual accumulation 300, reading the accumulated depth and depth weight from the texture buffer once all of the one or more objects are rendered to the screen and smoothing the read data using hardware texture bilinear interpolation 320, reconstructing the depth of the one or more objects using the smoothed read data 330, performing actual lighting for all accumulated objects in one rendering pass by using the reconstructed depth to reconstruct position of the one or more objects 340.

Figure 12:
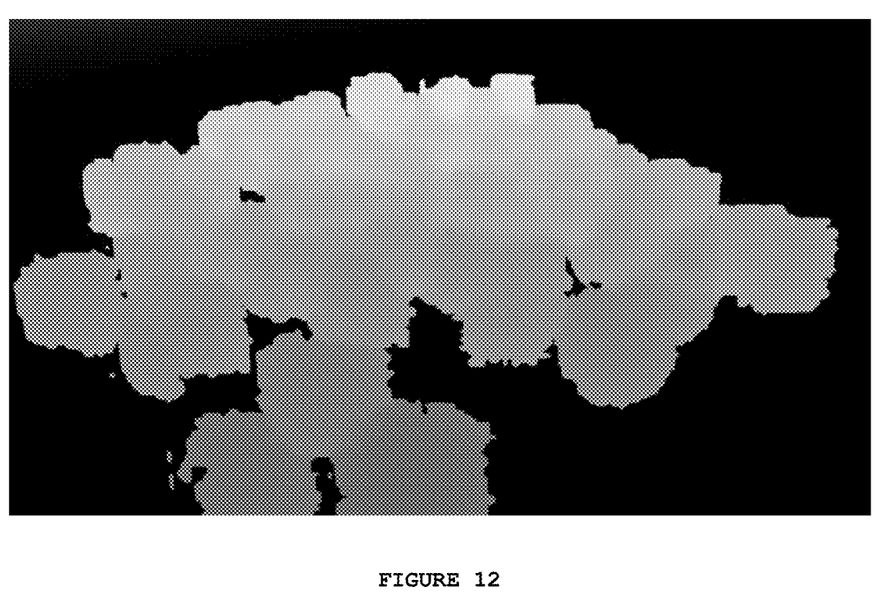
FIG. 12 provides depth re-construction of a cloud by using the depth encoding and depth weighting method disclosed herein.
Figure 13:
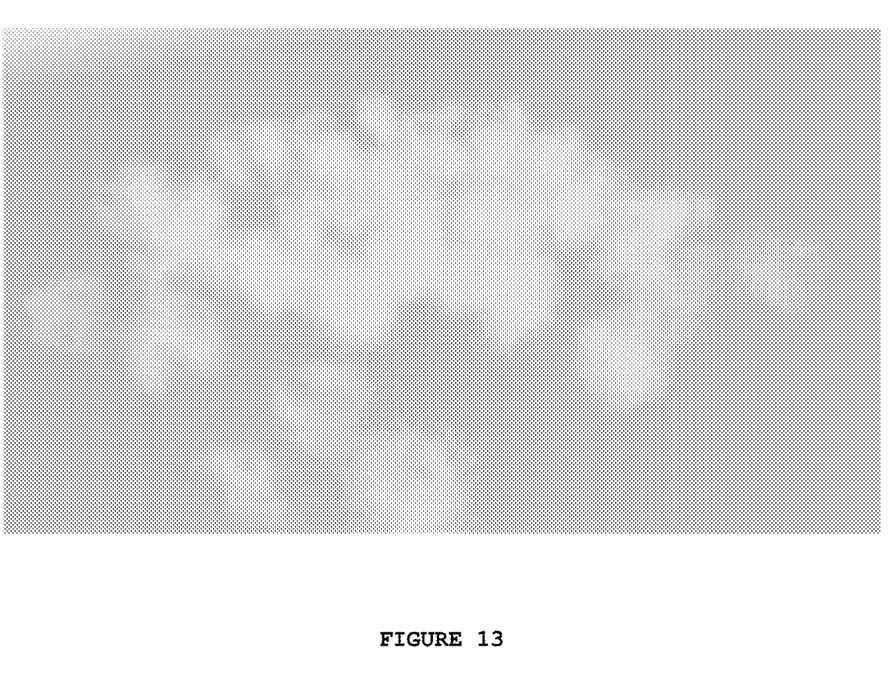
FIG. 13 presents an example of a cloud lighting effect generated by using the depth encoding and depth weighting method disclosed herein.

In yet a further embodiment, a dynamic lighting system disclosed herein stores the accumulated depth and normalization weight of multiple particles (e.g., cloud particles) for each pixel of impostor by a computer implementing a linear depth re-construction algorithm of:

(1) DepthAcc=OldDepthAcc*(1−newDepthWeight)+NewDepth*NewDepthWeight (2) DepthWeightAcc=OldDepthWeightAcc*(1−newDepthWeight)+NewDepthWeight (3) Final depth=DepthAcc/DepthWeightAcc In yet a further embodiment, a computer stores the accumulated depth and the normalization weight using a two channel floating-point 16-bit render target. Typically, when read by a computer the content of the two channel floating-point 16-bit render target will be bilinear filtered. While the division of values is not linear the values are substantially consistent. In another embodiment, a computer stores the accumulated depth and the normalization weight using a four channel floating-point 16-bit render target. By utilizing a four channel floating-point 16-bit render target, in addition to bilinear filtering, a normal or per-particle ambient occlusion data may also be stored by a computer so as to allow for more complex lighting effects. The resulting Final depth value can then be applied to an image, such as a representation of clouds (e.g., see FIG. 12). An example of the implementation of the linear depth re-construction method of the dynamic skydome system disclosed herein is demonstrated by the lighting of the clouds in FIG. 13.

Figure 6:
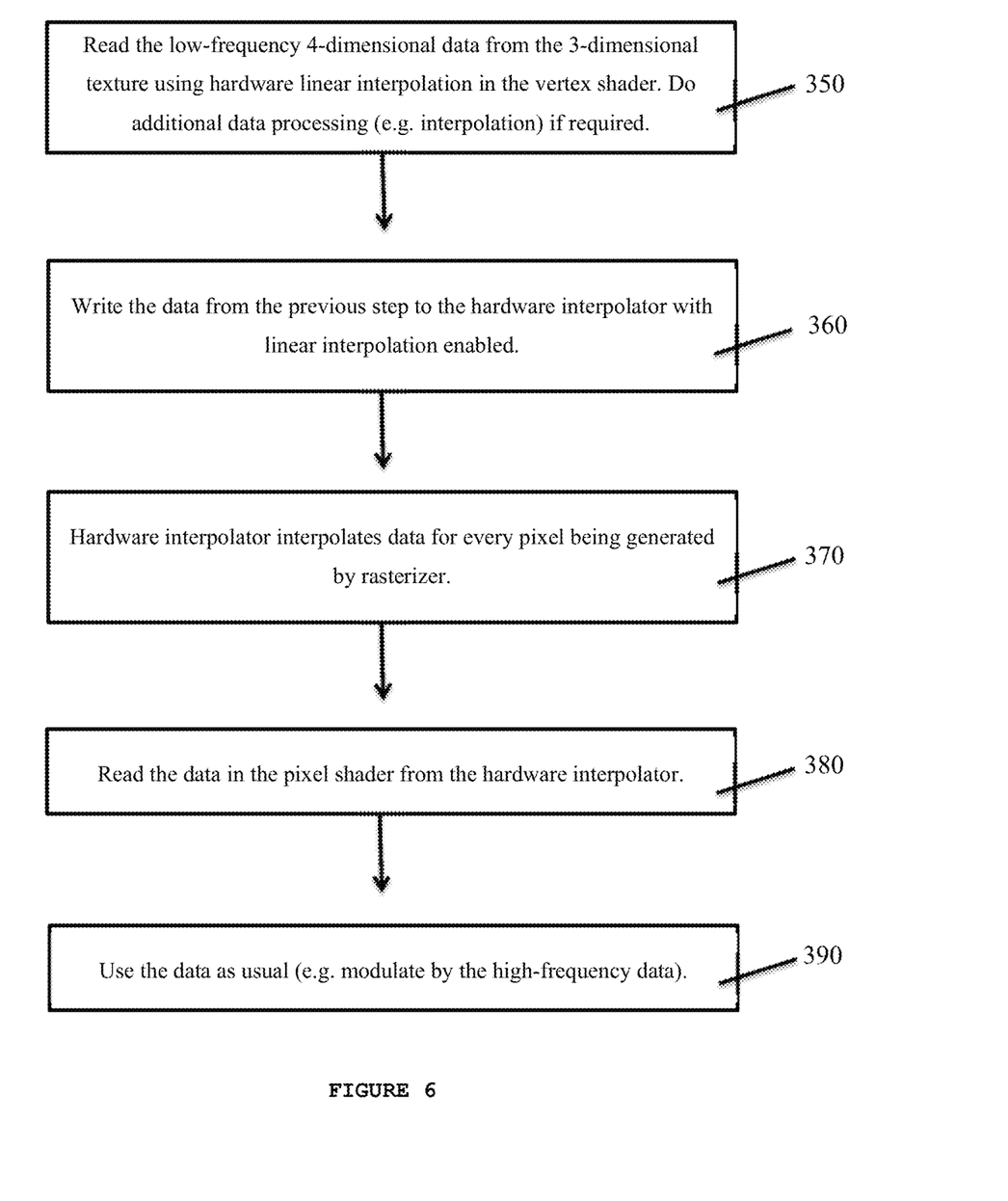
FIG. 6 is a flow diagram(s) depicting steps performed in an illustrative method of the dynamic skydome system disclosed herein for calculating sky or and/or atmosphere color in the vertex shader instead of the pixel shader.
Figure 7:
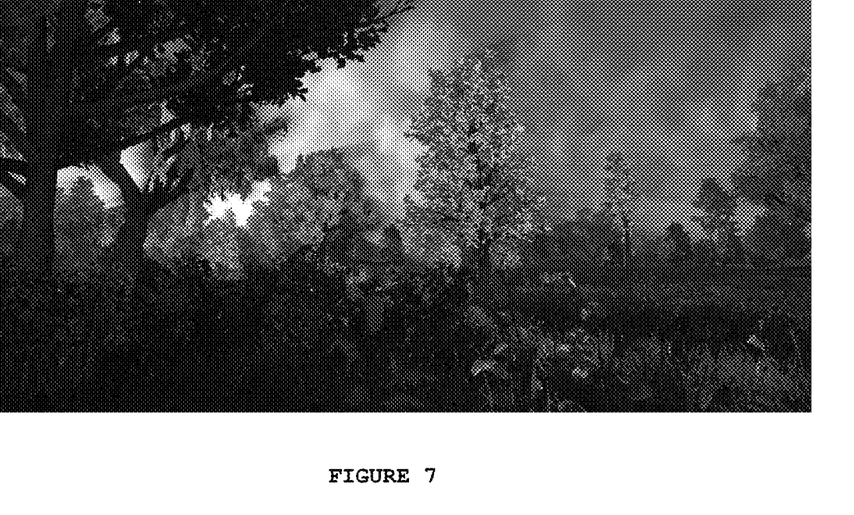
FIG. 7 presents an atmospheric effect generated by a dynamic skydome system of the disclosure of god rays.
Figure 8:
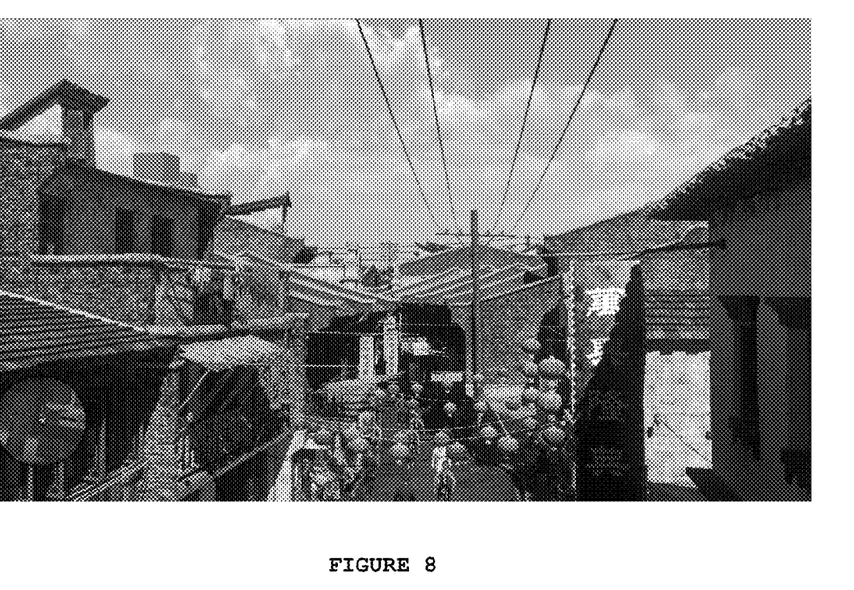
FIG. 8 presents an atmospheric effect generated by a dynamic skydome system of the disclosure of volumetric clouds depicted in a test level.
Figure 9:
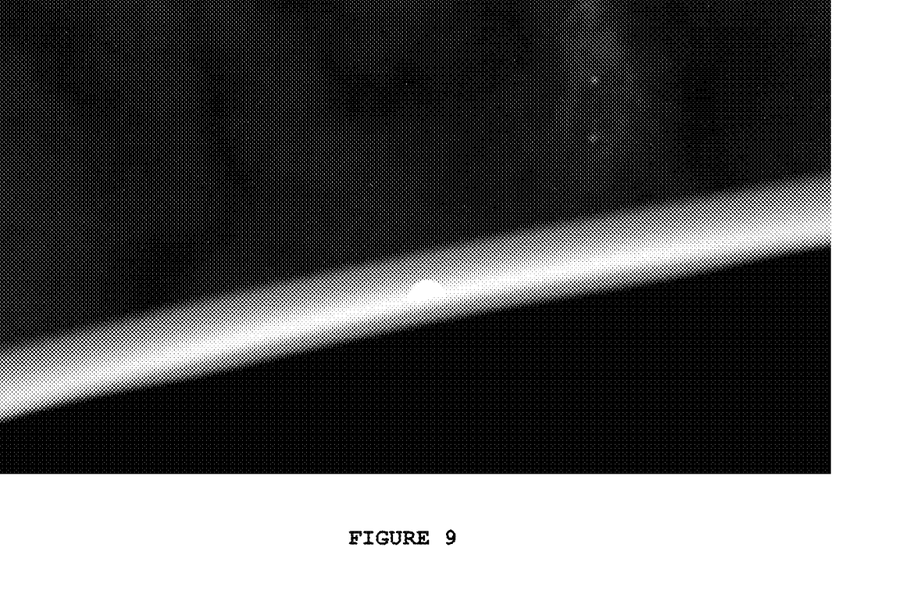
FIG. 9 presents an atmospheric effect generated by a dynamic skydome system of the disclosure of earth's atmosphere as approached from space.

The disclosure further provides for a dynamic skydome system disclosed herein which calculates sky or and/or atmosphere color in the vertex shader instead of the pixel shader (see FIG. 6). The dynamic skydome system disclosed herein calculates texture coordinates to read the textures, and uses 4-dimensional interpolation. Hardware only provides 3-dimensional interpolation of texture data. Universally, the $4^{th}$ dimension is interpolated in the pixel shader. By moving the texture coordinates and the texture read into the vertex shader the system utilizes the vertex to pixel shader hardware interpolators to perform the interpolation in the $4^{th}$ dimension thereby increasing the calculation's efficiency. In a further embodiment, the sky color calculated in the vertex shader is of the same or higher quality as sky color calculated in a pixel shader. In particular embodiment, the disclosure provides a dynamic skydome system that calculates sky and/or atmosphere color comprising the steps of: reading the low-frequency 4-dimensional data from the 3-dimensional texture using hardware linear interpolation in the vertex shader 350, writing the data from the previous step to a hardware interpolator with linear interpolation enabled 360, interpolating data for every pixel being generated by rasterizer using the hardware interpolator 370, reading the pixel data into the pixel shader from the hardware interpolator 380, using the data to calculate sky and/or atmosphere color 390. In a further embodiment, additional data processing may be performed during the reading of data step 350.

In an alternate embodiment, the dynamic skydome system disclosed herein performs the interpolation in the $4^{th}$ dimension using the pixel shader.

A number of embodiments have been described herein. Nevertheless, it will be understood that various modifications may be made without departing from the spirit and scope of this disclosure. Accordingly, other embodiments are within the scope of the following claims.

What is claimed is:

1. A dynamic skydome system that performs actual lighting for all accumulated objects in one rendering pass comprising:

rendering one or more objects accumulated depth and weight into a texture buffer of a graphics processing unit (GPU) using a blending algorithm to perform actual accumulation, wherein blending algorithm comprises the steps of:

(1) DepthAcc =OldDepthAcc*(1−newDepthWeight)+NewDepth*NewDepthWeight;

(2) DepthWeightAcc=OldDepthWeightAcc*(1−newDepthWeight) +NewDepthWeight; and (3) Final depth =DepthAcc/DepthWeightAcc;

reading the accumulated depth and depth weight from the texture buffer once all of the one or more objects are rendered to the screen and smoothing the read data using hardware texture bilinear interpolation;

reconstructing the depth of the one or more objects using the smoothed read data; and performing actual lighting for all accumulated objects in one rendering pass by using the reconstructed depth to reconstruct the position of the one or more objects.

2. The dynamic skydome system of claim 1, wherein a two channel floating-point 16-bit render target stores the accumulated depth and normalization weight of multiple particles for each pixel of impostor.

3. The dynamic skydome system of claim 1, wherein a four channel floating-point 16-bit render target stores the accumulated depth and normalization weight of multiple particles for each pixel of impostor, and wherein an additional normal or per-particle ambient occlusion data is also stored.

4. The dynamic skydome system of claim 1, wherein the dynamic skydome system further comprises calculating the color of the sky and/or atmosphere in the vertex shader comprising the steps of:

reading the low-frequency 4-dimensional data from the 3-dimensional texture using hardware linear interpolation in the vertex shader of the GPU;

writing the data from the previous step to a hardware interpolator with linear interpolation enabled;

interpolating data for every pixel being generated by rasterizer using the hardware interpolator;

reading the pixel data into the pixel shader from the hardware interpolator; and using the data to calculate sky and/or atmosphere color.

5. The dynamic skydome system of claim 1, wherein the objects are clouds, celestial bodies, and/or atmospheric particles.

6. The dynamic skydome system of claim 1, wherein system can perform one or more of the following:

mimicking the real-world behavior of a sky through a 24 hour day night cycle;

performing physically-based rendering with multiple atmospheric scatterings;

simulating of celestial bodies that are astronomically correct;

generating god rays;

providing aerial perspectives; and dynamically lighting volumetric clouds.

7. The dynamic skydome system of claim 1, wherein the system is carried out using a graphics processing pipeline of a computer.

8. The dynamic skydome system of claim 7, wherein the computer is a video game console.

9. A flight simulator comprising the dynamic skydome system of claim 1.

* * * * *